United States Patent [19]

Moriuchi

[11] Patent Number: 5,586,127
[45] Date of Patent: Dec. 17, 1996

[54] APPARATUS AND METHOD FOR CORRECTING ERROR IN DATA READ FROM RECORDING MEDIUM

[75] Inventor: Tsunehiko Moriuchi, Kasugai, Japan

[73] Assignees: Fujitsu Limited, Kawasaki; Fujitsu VLSI Limited, Kasugai, both of Japan

[21] Appl. No.: 350,181

[22] Filed: Nov. 30, 1994

[30] Foreign Application Priority Data

Nov. 30, 1993 [JP] Japan .................... 5-300441

[51] Int. Cl.⁶ .............................. G11B 20/18
[52] U.S. Cl. ............................ 371/40.1
[58] Field of Search ............... 371/40.1, 40.3, 371/37.1, 37.2, 37.6

[56] References Cited

U.S. PATENT DOCUMENTS

| | | | |
|---|---|---|---|
| 4,649,541 | 3/1987 | Lahmeyer | 371/37 |
| 4,747,103 | 5/1988 | Iwamura et al. | 371/37 |
| 4,841,300 | 6/1989 | Yoshida et al. | 341/94 |
| 4,897,840 | 1/1990 | Weiss et al. | 371/40.1 |
| 5,384,786 | 1/1995 | Dudley et al. | 371/37.1 |

*Primary Examiner*—Stephen M. Baker
*Attorney, Agent, or Firm*—Nikaido, Marmelstein, Murray & Oram LLP

[57] ABSTRACT

Disclosed is an apparatus for correcting error data contained in data read from an optical disk. The data correcting apparatus has a memory for storing data read out from the optical disk. The apparatus also has a syndrome generator for generating error syndrome data, and a circuit for detecting the position and value of data errors. The data correcting apparatus further includes a circuit for correcting errors in the read data stored in the memory, based on the error position and error value. The syndrome generator transfers a first ID data field for data identification together with the syndrome data via a first direct bus, provided between the syndrome generator and the detecting circuit. The detecting circuit transfers a second ID data field for data identification together with error information data via a second direct bus, provided between the detecting circuit and the data correcting circuit.

8 Claims, 14 Drawing Sheets

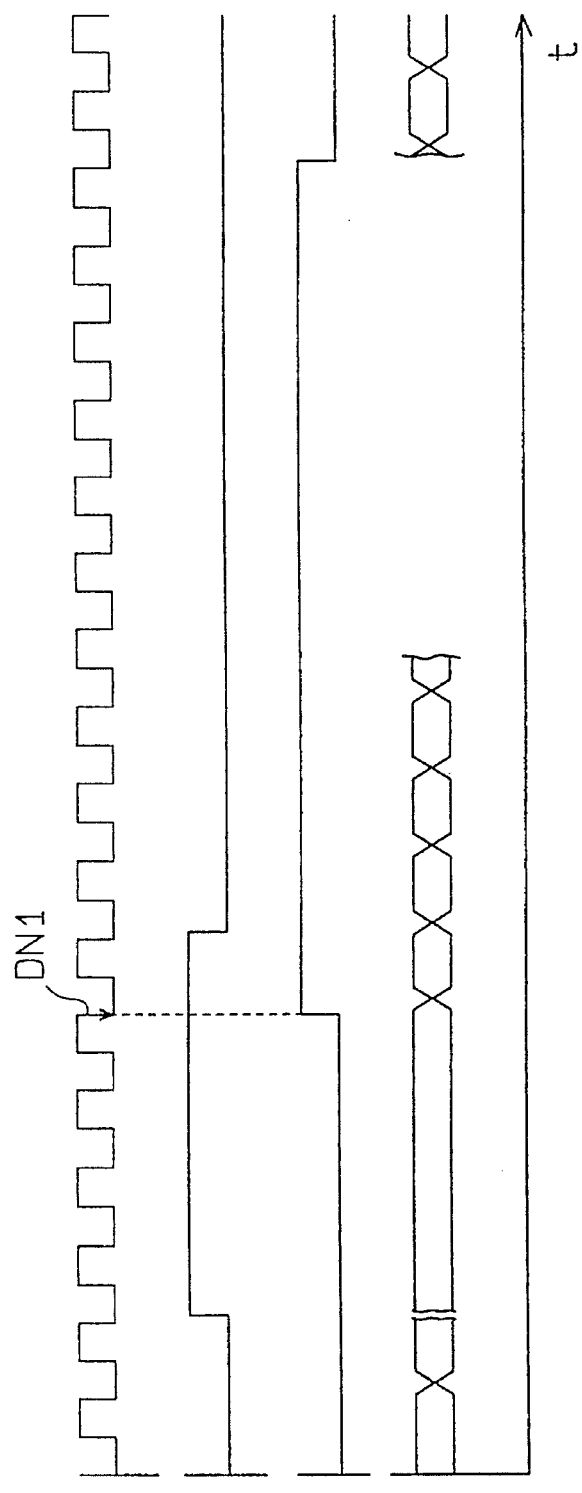

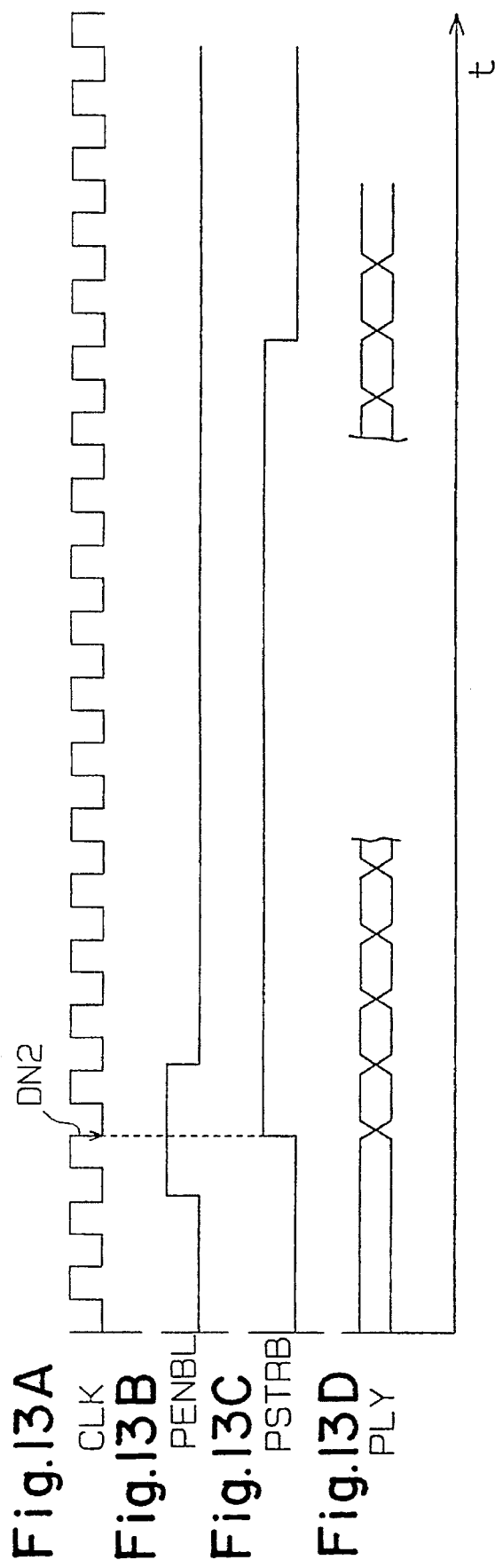

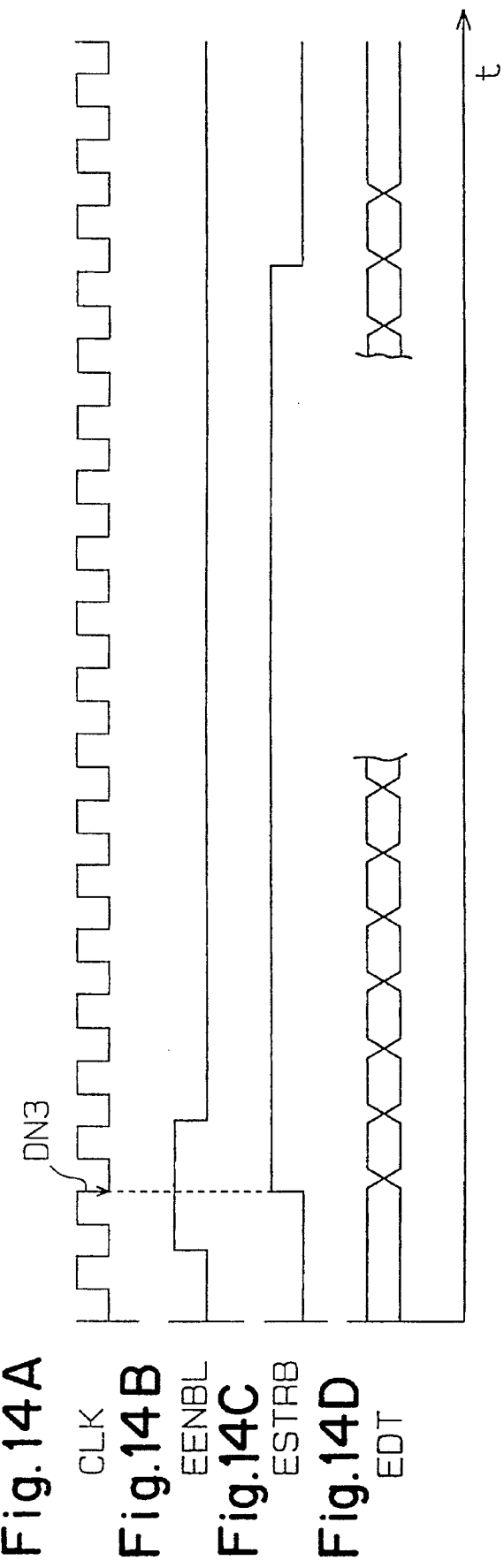

APPARATUS AND METHOD FOR CORRECTING ERROR IN DATA READ FROM RECORDING MEDIUM

BACKGROUND OF THE INVENTION

1. Field of the Invention

The present invention relates generally to an apparatus and method for correcting an error in data read from a recording medium which stores data. More particularly, this invention relates to an apparatus and a method to detect and correct errors contained in data used in recording and reproducing system which uses an optical disk as a recording medium.

2. Description of the Related Art

Data transfer rates between optical disk recording and reproduction devices and their host processors have undergone a significant increases over the past number of years. Accompanying this increase has been a demand for increased operational speeds of devices used to defect and correct errors occurring in the data transferred between the disk recording and reproduction devices and their host processors.

In this technology, the term "optical disk" means a disk type recording medium onto and from which data can be written and read using the optical technology. An optical disk has a plurality of data storage areas called "sectors". FIG. 1 shows a conventional data correcting apparatus for use in an optical disk system. This data correcting apparatus comprises a formatter circuit 1, a buffer memory controller 2, a syndrome generator 3, a reducer circuit 5, a Chien search circuit 6, a buffer memory 7, and an interface circuit 8. The formatter circuit 1, buffer memory controller 2, syndrome generator 3, reducer circuit 5 and Chien search circuit 6 are controlled by a microprocessor 4.

The formatter circuit 1 receives read data from an optical disk data reading apparatus (not shown) via the interface circuit 8. In this case, data recorded on an optical disk is coded based on Cross Interleave Reed Solomon coding. When receiving the coded read data from the data reading apparatus, the formatter circuit 1 decodes the read data and outputs the decoded data to the buffer memory controller 2 and the syndrome generator 3. The decoded data includes an ECC (Error Checking and Correcting) code which is used to detect and correct for errors contained in the data.

Based on the decoded data and the ECC code, the syndrome generator 3 generates an ECC syndrome, a data matrix, based on the Cross Interleave Reed Solomon code (CIRC). The ECC syndrome has a matrix type data structure, and is produced only when the decoded data contains an error. The syndrome generator 3 has a status register 3a. When two sectors of decoded data are output to the syndrome generator 3 from the formatter circuit 1 and after one sector of ECC syndromes has been generated, a flag is set to "1" in the status register 3a. The microprocessor 4 then reads one sector of the ECC syndromes generated by the syndrome generator 3, and writes it to the reducer circuit 5.

The reducer circuit 5 then computes the coefficients in a polynomial equation for determining the position of an error and in a polynomial equation for obtaining an error value based on CIRC. The reducer circuit 5 also has a status register 5a. Following the computational operation performed by the reducer circuit 5 based on the ECC syndromes, a flag is set to "1" in the status register 5a. The microprocessor 4 next reads the computed coefficients of an error position polynomial equation and an error value polynomial equation from the reducer circuit 5, and writes the coefficients in the Chien search circuit 6.

Utilizing the coefficients output from the reducer circuit 5, the Chien search circuit 6 computes the error value and error position of the decoded data. Based on the computed error value, the Chien search circuit 6 computes a CRC (Cyclic Redundancy Check) syndrome for error detection.

The Chien search circuit 6 has a status register 6a. When the computations for the error position and error value in the Chien search circuit 6 are completed, the flag in the status register 6a is set to "1". Given this value of the flag in the status register 6a, the microprocessor 4 reads the computed error value and error position from the Chien search circuit 6.

Based on a command from the microprocessor 4, the buffer memory controller 2 stores the decoded data from the formatter circuit 1 into the buffer memory 7, and outputs data stored in the buffer memory 7 to the microprocessor 4.

FIG. 2 illustrates a flowchart depicting the operation of this data correcting apparatus. When read data from the data reading apparatus is input to the formatter circuit 1, the formatter circuit 1 decodes the read data and outputs the decoded data to the buffer memory controller 2 and the syndrome generator 3. The buffer memory controller 2 stores the received decoded data in the buffer memory 7.

At step 1, the microprocessor 4 determines if the flag set in the status register 3a is "1", i.e., if one sector of ECC syndromes has been generated by the syndrome generator 3. When the flag's value changes to "1", the microprocessor 4 reads that one sector of ECC syndromes (step 2) and writes the ECC syndromes in the reducer circuit 5 (step 3).

At step 4, the microprocessor 4 activates the reducer circuit 5 to compute the coefficients of an error position polynomial equation and of an error value polynomial equation based on the ECC syndromes sent to the reducer circuit 5 from the syndrome generator 3.

At step 5, the microprocessor 4 determines if the flag set in the status register 5a of the reducer circuit 5 is "1", i.e., if the computation in the reducer circuit 5 is complete. When the flag's value changes to "1", the microprocessor 4 reads the error position coefficients and the error value coefficients from the reducer circuit 5 at step 6.

The microprocessor 4 writes the read coefficients in the Chien search circuit 6 at step 7, and activates the Chien search circuit 6 at step 8. At step 9, the microprocessor 4 determines if the flag set in the status register 6a of the Chien search circuit 6 is "1", i.e., if the computations in the Chien search circuit 6 are complete. When the flag's value changes to "1", the microprocessor 4 reads the computed error position and value from the Chien search circuit 6 at step 10.

Based on the read error position information determined at step 11, the microprocessor 4 then computes an address in the buffer memory 7 where the data contains an error. The microprocessor then outputs a read command to the buffer memory controller 2 to read error data stored at that address in the buffer memory 7 at step 12.

When the error data reading operation of the microprocessor 4 is completed at step 13, the microprocessor 14 corrects the read decoded data containing an error based on the error value information. At step 15, the microprocessor 4 writes the corrected data in the buffer memory 7 via the buffer memory controller 2.

In parallel to the operations at steps 10 to 15, the microprocessor 4 generates a CRC syndrome and computes CRC data using the CRC syndrome to determine if the result of the error correction is correct. Through the above-described sequence of operations, the correction of one sector of decoded data is completed.

In the data correcting apparatus, the microprocessor 4 always monitors the flags in the status registers 3a, 5a and 6a in the syndrome generator 3, reducer circuit 5 and Chien search circuit 6. When each flag is set to "1", the microprocessor 4 issues instructions to carry out subsequent operations. Due to this, there is a relatively long wait time from the end of the computation in each of the circuits 3, 5 and 6 to the next operation.

Due to the constant monitoring of the above-mentioned flags, the microprocessor 4 must devote a significant amount of processing time just to flag monitoring. This places constraints on the amount of processing which the microprocessor 4 can devote to other operations, and in effect, results in a loss of processing speed.

To execute decoded data correction in the buffer memory 7, the microprocessor 4 accesses the buffer memory 7 via the buffer memory controller 2. The time the microprocessor 4 requires to access the memory 7 further detracts from the processing time available to other operations. This delays the other operations of the microprocessor 4 than the accessing operation.

The CRC syndrome generated in the Chien search circuit 6 is read out by the microprocessor 4 and is used in a predetermined computation to obtain CRC data. The time required by the microprocessor 4 to make the necessary computations based on the CRC syndrome, also detracts from other operations of the microprocessor 4 and effectively decreases the processing reserve of the microprocessor 4.

SUMMARY OF THE INVENTION

Accordingly, it is a primary objective of the present invention to shorten the time needed by the microprocessor to access error correction and control circuitry.

To achieve the foregoing and other objects and in accordance with the purpose of the present invention, an improved data correcting apparatus is provided. As shown in FIG. 3, the data correcting apparatus has a storage unit 57 for storing data read out from a recording medium 55. The apparatus also has a syndrome generating unit 56 for generating error syndrome data based on the read data and ECC code data. The syndrome generating unit 56 affixes a first ID data field to the generated syndrome data for identifying data. The apparatus further has a detecting unit 58 for detecting error data position and value and for generating error information data based on the syndrome data generated by the syndrome generating unit 56. The detecting unit 58 affixes a second ID data field to the generated error information data for data identification. A first direct bus is provided between the syndrome generating unit 56 and the detecting unit 58. The syndrome generating unit 56 transfers the syndrome data and first ID data field to the detecting unit 58 via the first direct bus. The data correcting apparatus further includes a data correcting unit 59 for correcting errors contained in the read data stored in the storage unit 57, based on the error position and value detected by the detecting unit 58. A second direct bus is provided between the detecting unit 58 and the data correcting unit 59. The detecting unit 58 transfers the error information data and the second ID data field to the data correcting unit 59 via the second direct bus.

According to the data correcting apparatus embodying the present invention, the first ID data field for data identification is affixed to the syndrome data that is transferred to the detecting unit 58 from the syndrome generating unit 56. Based on the first ID data field, the detecting unit 58 identifies the transferred syndrome data. Further, the second ID data field for data identification is affixed to the error information data that is transferred to the data correcting unit 59 from the detecting unit 58. Based on the second ID data field, the detecting unit 58 identifies the transferred error information data. Neither the identification of data by the detecting unit 58 nor the data correcting unit 59 require that the microprocessor should monitor data transfer. This shortens the time the microprocessor 4 needs to access those units. This data identification can shorten the processing time needed for controlling the individual units, thus improving the data processing speed.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings.

FIG. 12 is a timing chart illustrating the operation of the syndrome generator;

FIG. 13 is a timing chart illustrating the operation of the reducer circuit; and FIG. 14 is a timing chart illustrating the operation of the Chien search circuit.

DETAILED DESCRIPTION OF THE PREFERRED EMBODIMENT

Figure 1:
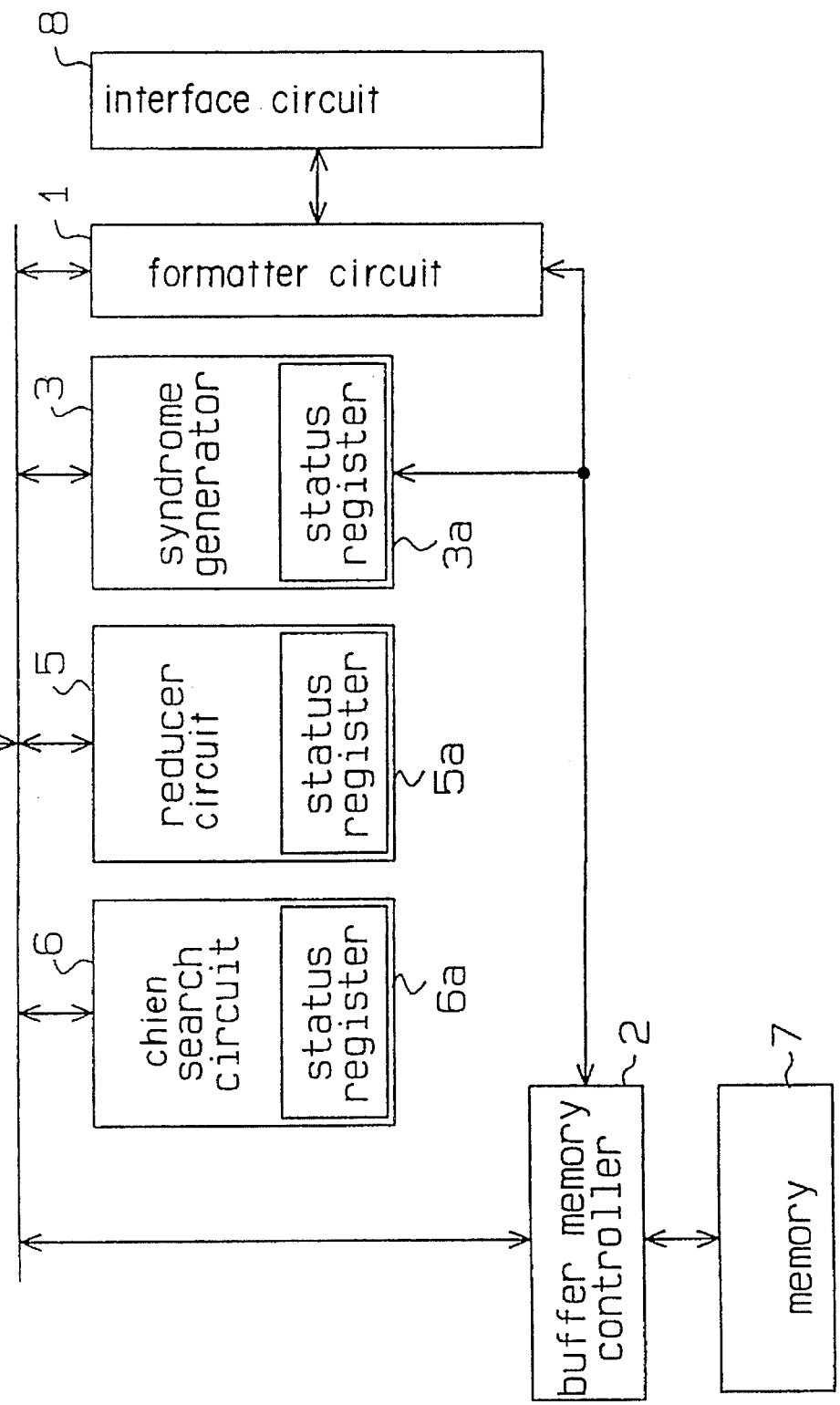
FIG. 1 is a block diagram of a conventional data correcting apparatus.
Figure 2:
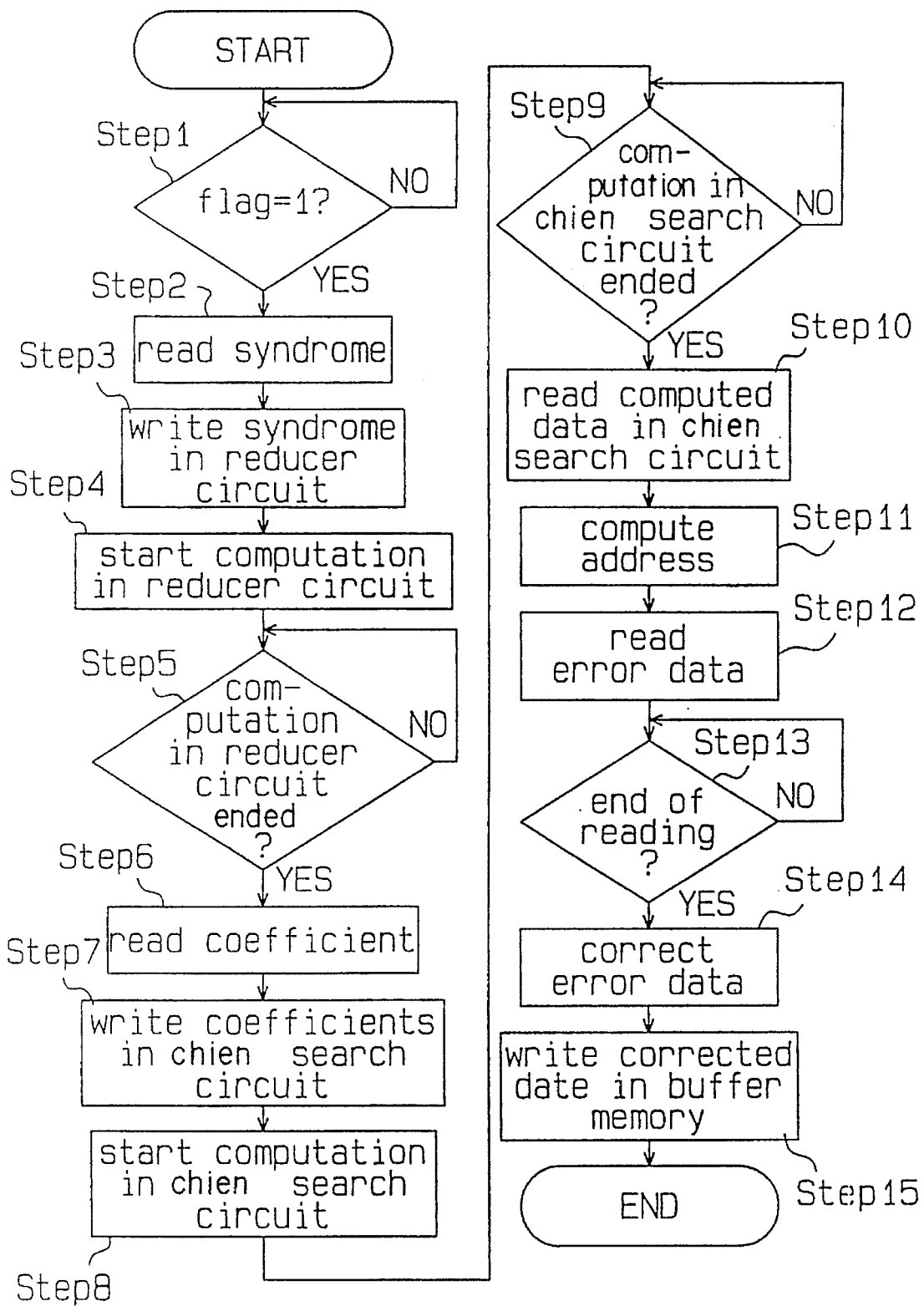
FIG. 2 is a flowchart illustrating the operation of the data correcting apparatus.
Figure 3:
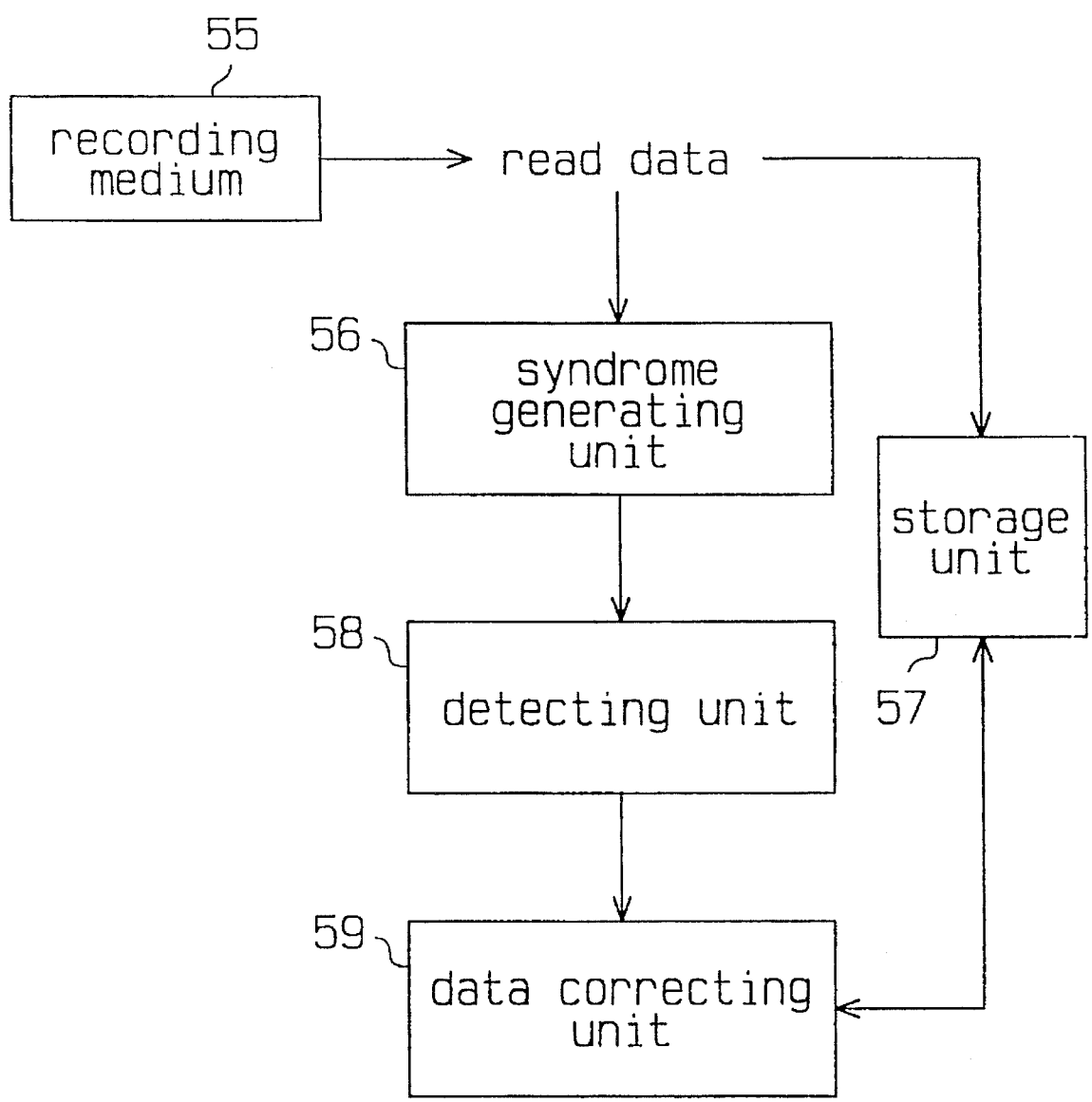
FIG. 3 is a block diagram showing essential components of the present invention.
Figure 4:
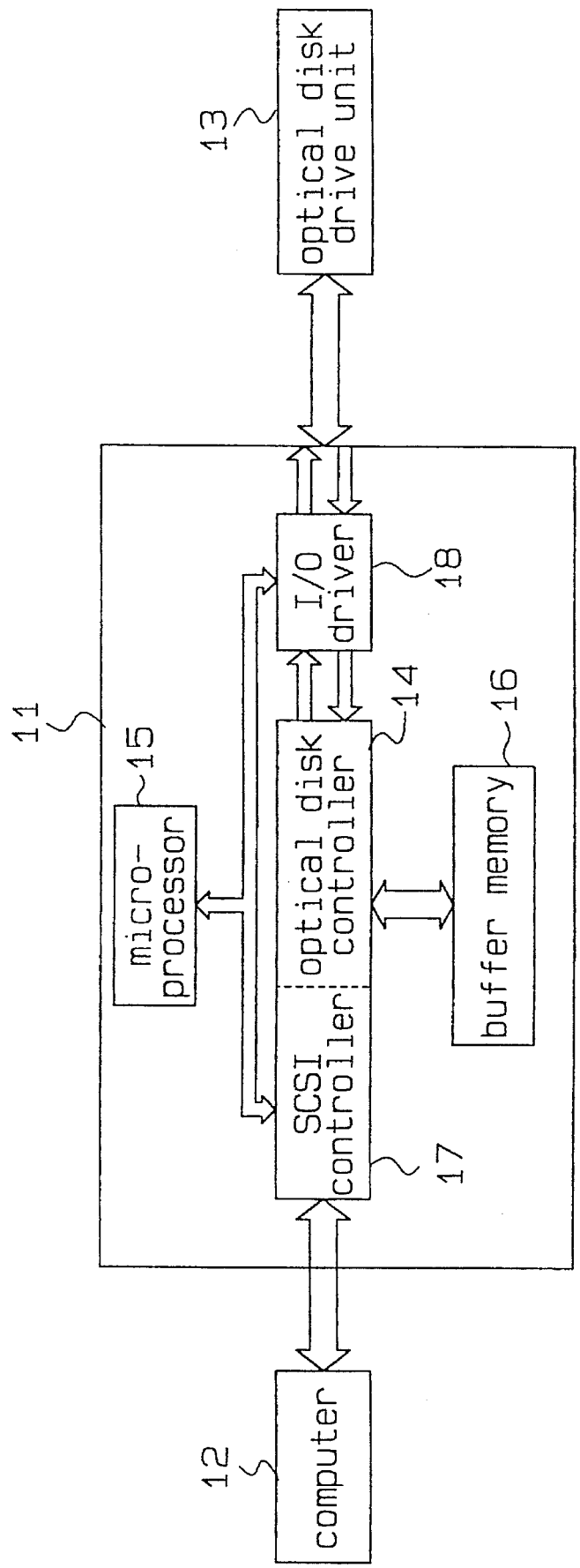
FIG. 4 is a block diagram showing an optical disk control unit according to one embodiment of this invention.

A data correcting apparatus according to one embodiment of the present invention will now be described referring to the accompanying drawings. This embodiment is an example where the present invention is applied to an optical disk control unit as shown in FIG. 4.

An optical disk control unit 11 is connected to a computer 12 via an unillustrated SCSI (Small Computer System Interface) and is also connected to an optical disk drive unit 13 via a disk interface (not shown).

The optical disk control unit 11 includes an optical disk controller 14, a microprocessor 15, a buffer memory 16 constituted of DRAMs, a SCSI controller 17 and an input/output (I/O) driver 18.

The optical disk controller 14 executes the following processes.

(1) Transfer of commands to the optical disk drive unit 13 and reception of statuses, associated with the transferred commands, from the optical disk drive unit 13.

(2) Generation of a write format when data is written on an optical disk.

(3) Interpretation of the format of data read from the optical disk and correction of an error in the read data.

(4) Transfer of data between the optical disk drive unit 13 and the buffer memory 16. (5) Transfer of data between the SCSI controller 17 and the buffer memory 16.

When receiving data to be written on the optical disk from the computer 12 via the SCSI controller 17, the optical disk controller 14 temporarily stores the data in the buffer memory 16. Then, the optical disk controller 14 reads necessary data from the buffer memory 16, performs predetermined processing on the read data, and outputs the resultant data via the I/O driver 18 to the optical disk drive unit 13.

During reading operation of data from the optical disk, the optical disk controller 14 performs predetermined processing on the read data output from the optical disk drive unit 13 and temporarily stores the resultant data in the buffer memory 16. When a certain amount of data is accumulated in the buffer memory 16, the optical disk controller 14 collectively transfers the data to the computer 12 via the SCSI controller 17.

Generally, the rate of errors in reading data from an optical disk is high. In this respect, an error checking and correcting (ECC) code as well as data are written in advance in the buffer memory 16. The optical disk controller 14 corrects an error in the read data stored in the buffer memory 16 based on the ECC code.

Figure 5:
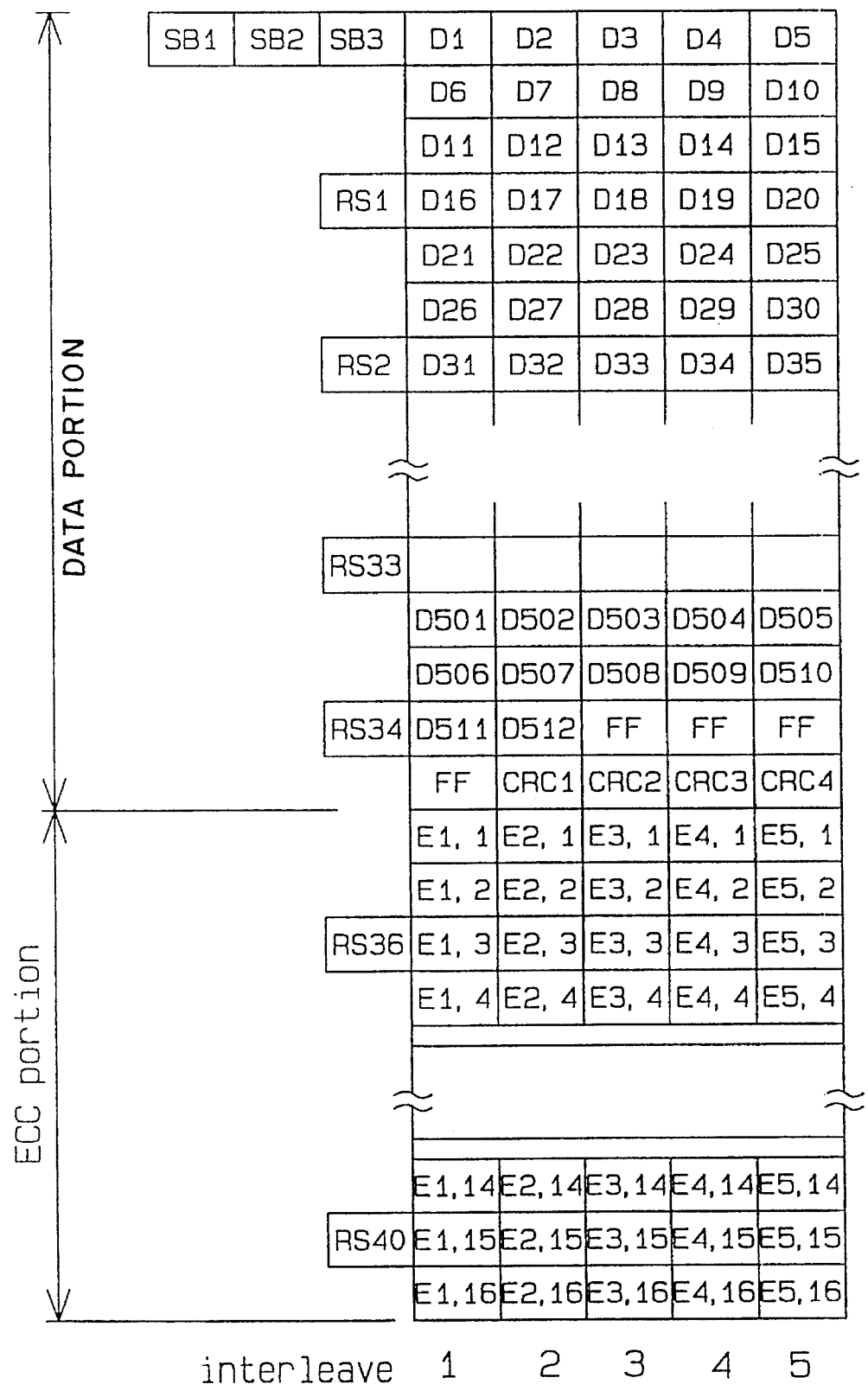
FIG. 5 is a partial view of sector of data to be written on an optical disk.

FIG. 5 shows one sector of data to be written on the optical disk. One sector of data consists of a data portion of 104 rows and an ECC portion of 16 rows. The individual bytes of the data portion as well as the ECC portion are written in a sequence in a spiral form on the optical disk. Error correction based on the ECC is performed on the individual bytes arranged in the vertical direction in FIG. 5, and cyclic redundancy check (CRC) is performed on the individual bytes arranged in the horizontal direction. One vertical line of bytes constitutes a single interleave.

Figure 6:
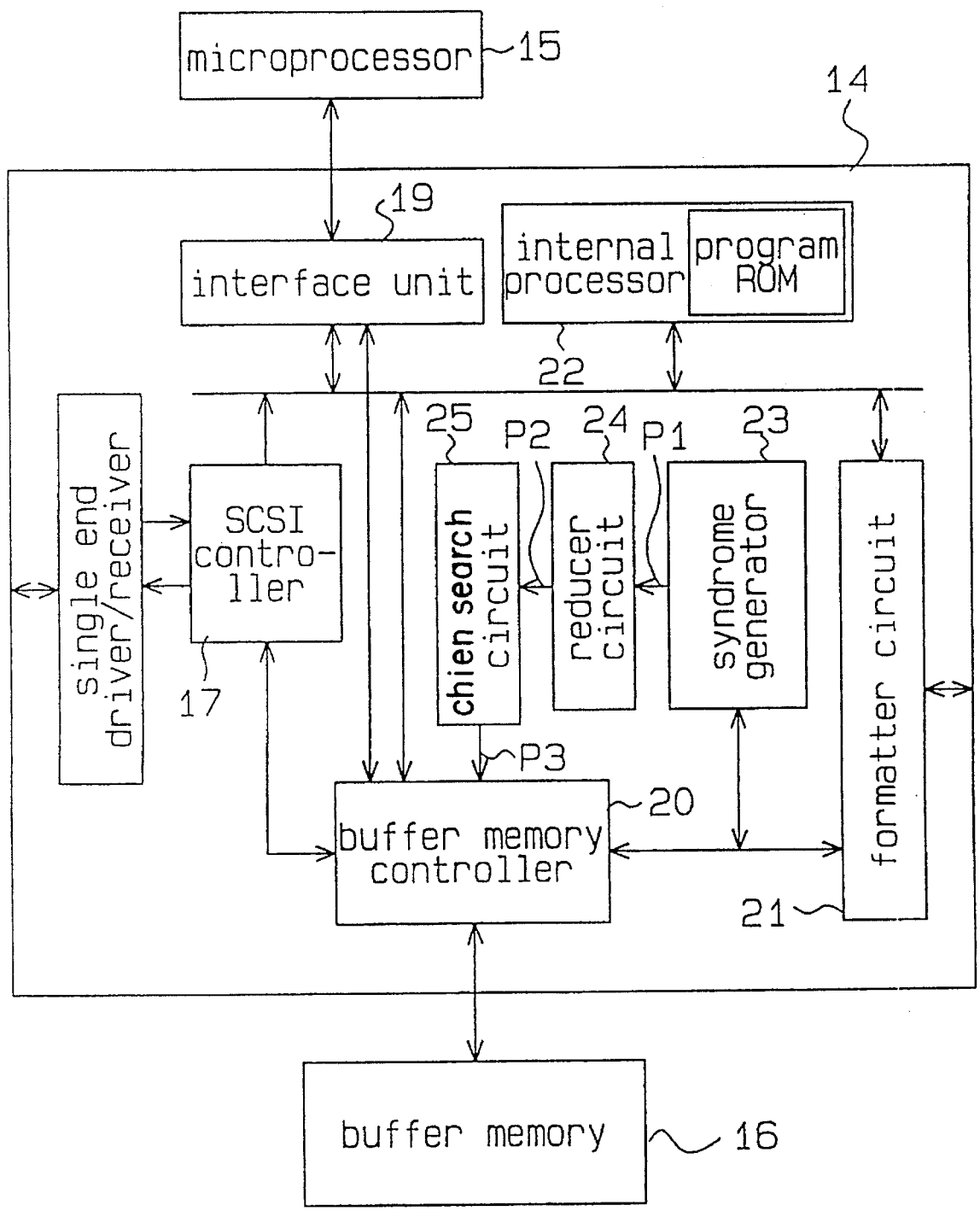
FIG. 6 is a block diagram illustrating an optical disk controller.

FIG. 6 shows the structure of the optical disk controller 14. The optical disk controller 14 has an interface unit 19 and a buffer memory controller 20 which controls DMA (Direct Memory Access) transfer. The optical disk controller 14 further includes a formatter circuit 21 for encoding and decoding data, an internal processor 22, a syndrome generator 23, a reducer circuit 24 as an error correcting unit, and a Chien search circuit 25.

The interface unit 19 exchanges commands and the results of processes, executed by the microprocessor 15, with the microprocessor 15. The interface unit 19 incorporates a memory for storing parameters necessary for executing a command. When the microprocessor 15 accesses the buffer memory 16, data transmission and reception are performed via the interface unit 19 and the buffer memory controller 20.

The buffer memory controller 20 performs the following functions:

(1) Writes and reads data in and from the buffer memory 16.

(2) Controls the refreshing of cell information of the buffer memory 16.

(3) Controls data exchange with the formatter circuit 21.

(4) Controls data transfer to the Chien search circuit 25.

(5) Corrects data stored in the buffer memory 16 based on error information sent from the Chien search circuit 25.

When data is written on the optical disk, the formatter circuit 21 performs parallel-serial conversion and coding to an RLL (Run Length Limited) code and outputs data with an affixed sync signal to the I/O driver 18.

When data is read from the optical disk, the formatter circuit 21 interprets a data pattern read from the optical disk to separate the sync signal from the data, decode data and perform serial-parallel conversion.

The internal processor 22 interprets a command input from the microprocessor 15 and executes the interpreted command. The internal processor 22 reports the results of the execution of the command to the microprocessor 15 and controls a sequence of processes on a plurality of sectors and a single process on a plurality of sectors.

At the time of writing data on the optical disk, the syndrome generator 23 generates an ECC code and a CRC code based on the write data and outputs those codes to the formatter circuit 21. At the time of reading data from the optical disk, the syndrome generator 23 generates an ECC syndrome and CRC data.

As generally known, syndrome, Si, is represented by the equation as follows:

$$Si = A(\alpha^{b+i})$$

where "A" is read data, "$\alpha^b$" is the element of Galois field, "i" is an integer selected from 0, 1, 2, ... 14, 15. In this embodiment, "b" is set to 120. The syndrome generator 23 incorporates a buffer memory for temporarily storing the ECC syndrome. This buffer memory is capable of storing two sectors of ECC codes or ECC syndromes.

Figure 7:
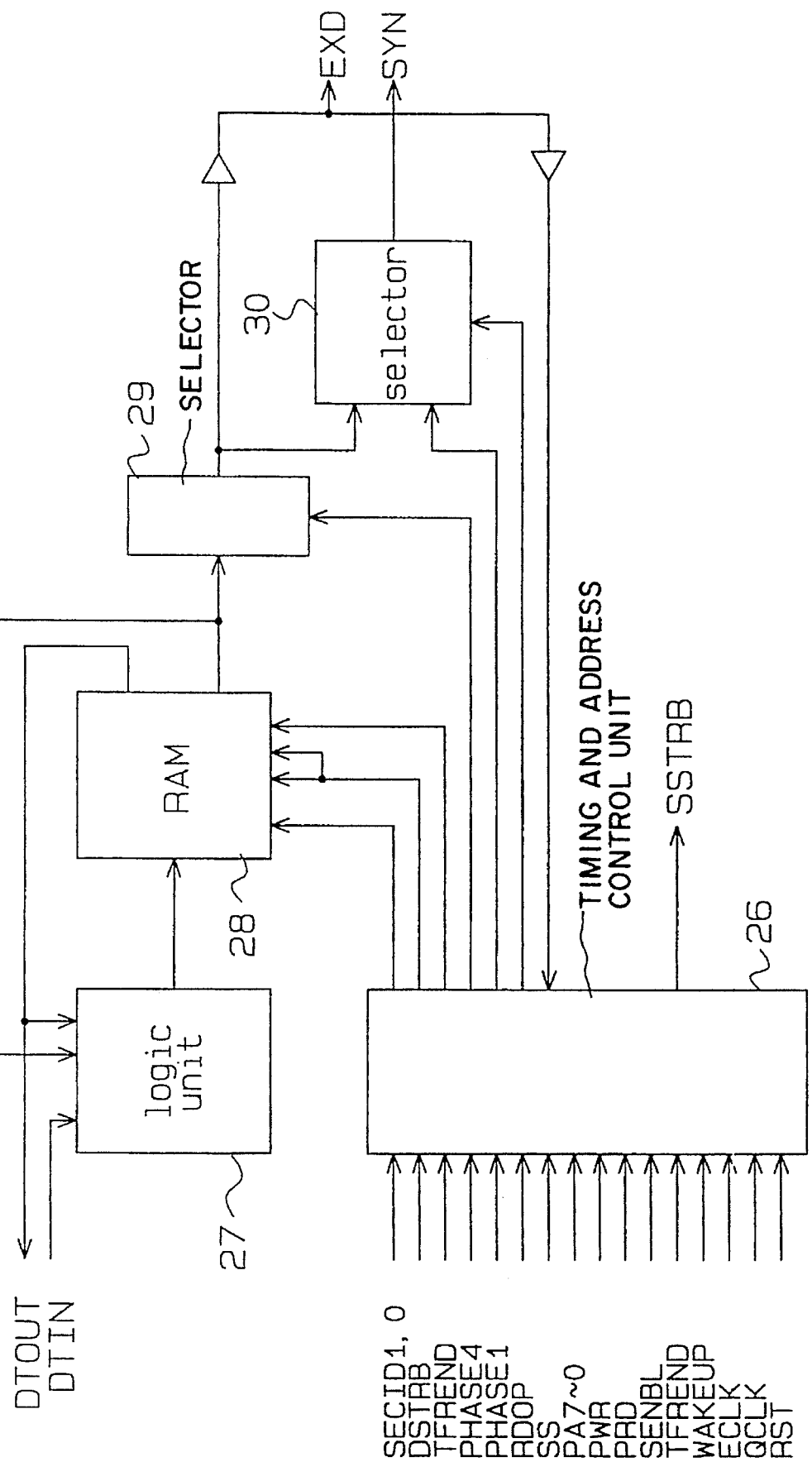
FIG. 7 is a diagram showing a syndrome generator.

FIG. 7 illustrates the constitution of the syndrome generator 23. The syndrome generator 23 includes a timing and address control unit 26, a logic unit 27, a RAM 28, a selector 29 which selects and outputs 8 bits from a 64-bit input signal, and a selector 30 which selects and outputs 8 bits from a 16-bit input signal.

The timing and address control unit 26 controls the operation timings of the logic unit 27, RAM 28 and selectors 29 and 30 based on multiple control signals received from the formatter circuit 21.

Based on data received from the formatter circuit 21, the logic unit 27 computes an ECC syndrome by a known computing scheme and stores the ECC syndrome in the RAM 28. When one sector of ECC syndromes is stored in the RAM 28, the ECC syndrome SYN is sent via the selectors 29 and 30 to the reducer circuit 24. At this time, the output signal of the selector 30 is sent to the reducer circuit 24 via a direct bus P1 shown in FIG. 6.

The timing and address control unit 26 generates a packet ID as identification information and outputs it to the selector 30. The selector 30 in turn outputs the packet ID together with the ECC syndrome to the reducer circuit 24.

Figure 9:
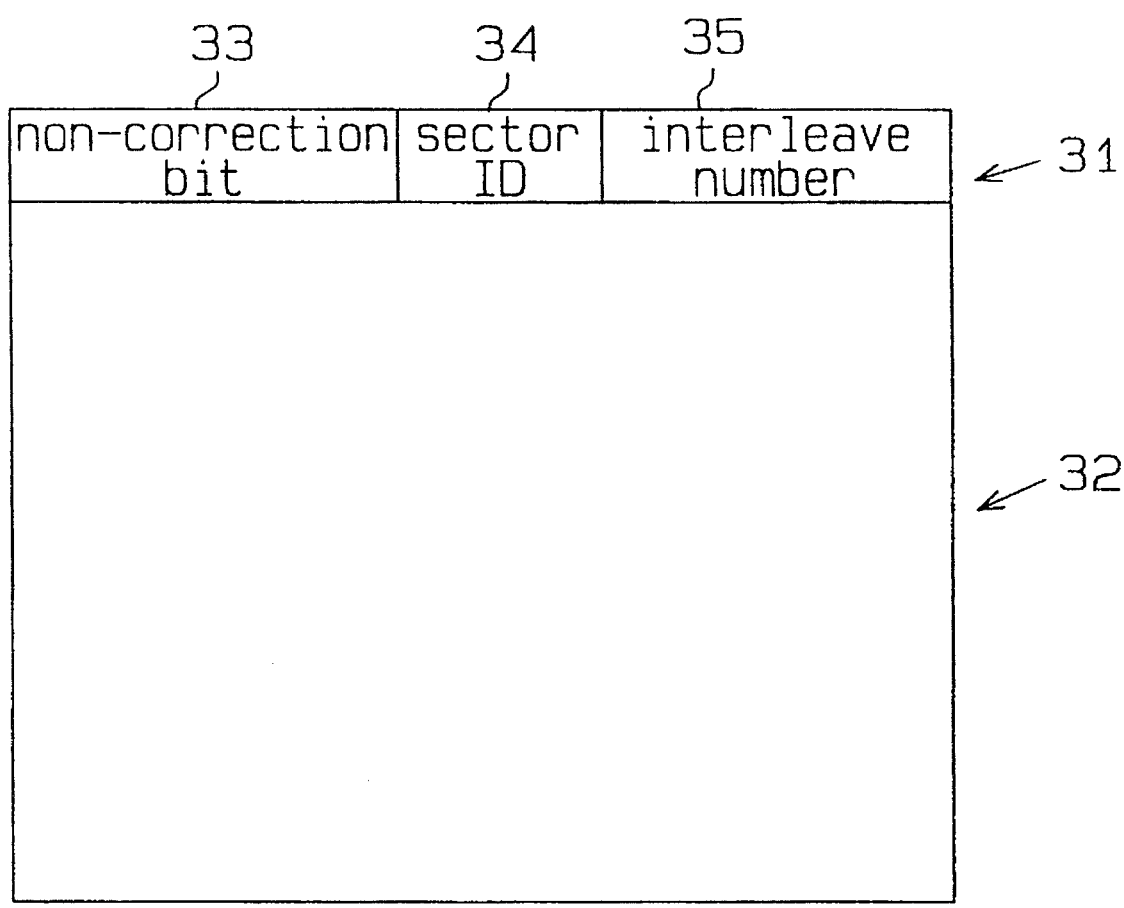
FIG. 9 is a diagram showing the data format of one sector of data that is sent to the reducer circuit from the syndrome generator.

FIG. 9 shows the transfer format of one sector of data that is output from the syndrome generator 23. This one sector of data consists of an ID data field 31 for storing a packet ID and a syndrome data field 32 for storing an ECC syndrome.

The ID data field or segment 31 essentially consists of a non-correction bit 33, a sector ID 34 and an interleave number 35.

The value of the correction bit 33 is either "0" or "1". "1" is stored in the non-correction bit 33 when no data error correction is performed, in which case only the ID data field 31 is output to the reducer circuit 24.

ID data that specifies which sector the data belongs to is stored in the sector ID 34. Data, indicating which sector's interleaving is performed, is stored in the area of the interleave number 35.

As shown in FIG. 12, when an SENBL signal output from the reducer circuit 24 goes high following data computation for one sector of data by generator 23, the reducer circuit 24 is set to receive data from the syndrome generator 23. Then, the syndrome generator 23 outputs an H-level SSTRB signal to the reducer circuit 24 in synchronism with the next falling DN1 of a clock signal CLK. When "0" is stored in the non-correction bit 33, the syndrome generator 23 sequentially transfers the data SYN, stored in the ID data field 31 and the syndrome data field 32, to the reducer circuit 24, 8 bits at a time, starting from the ID data field 31.

Figure 8:
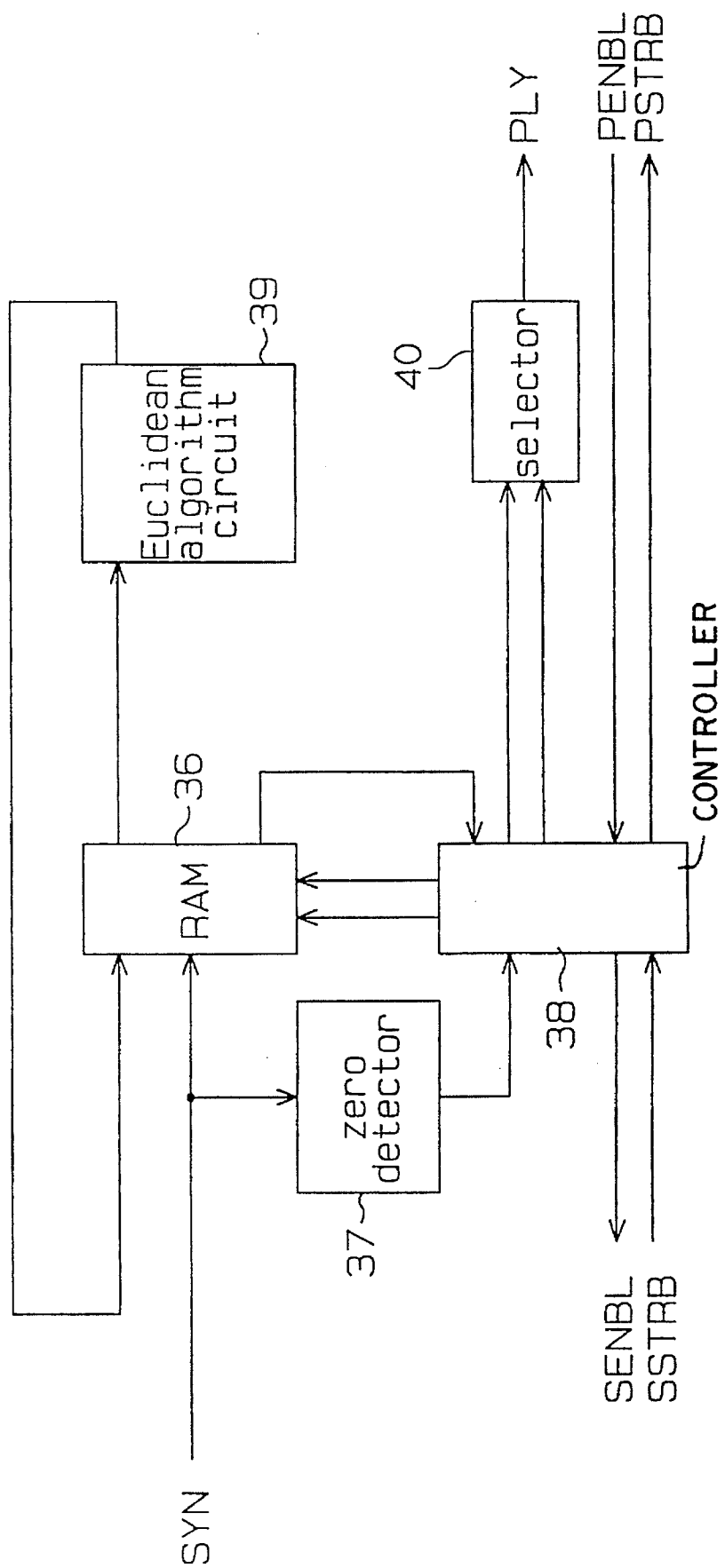
FIG. 8 is a diagram showing a reducer circuit.

FIG. 8 shows the configuration of the reducer circuit 24. The ECC syndrome SYN is input to a RAM 36 and a zero detector 37. The zero detector 37 determines if the values of the ECC syndrome SYN are all "0" and outputs the result of the determination to a controller 38. When the values of the ECC syndrome SYN are not all "0", the controller 38 determines that the data contains an error, and stores the ECC syndrome in the RAM 36.

The ECC syndrome SYN stored in the RAM 36 is read out to a Euclidean algorithm circuit 39. The Euclidean algorithm circuit 39 computes the coefficients of an error position polynomial equation and of an error value polynomial equation based on the ECC syndrome SYN in the same manner as done in the above-described prior art, and stores the results in the RAM 36.

As generally known, the error position polynomial equation, $\sigma(x)$, and the error value polynomial equation, $\omega(x)$, are represented by the following equations, respectively.

$$\sigma(x)=\sigma_0+\sigma_1 x +\sigma_2 x^2+\ldots+\sigma_{n-1}x^{n-1}+\sigma_n x^n$$

$$\omega(x)=\omega_0+\omega_1 x +\omega_2 x^2+\ldots+\omega_{n-1}x^{n-1}$$

where "x" is variable; "n" is an integer; and the respective coefficients, $\sigma_n$, and $\omega_{n-1}$ are the values computed based on ECC syndrome in accordance with Euclidean algorithm and indicate the elements of Galois field.

The controller 38 outputs the coefficients of the error position and error value polynomial equations to a selector 40. Furthermore, the controller 38 generates packet ID to be combined with data of the coefficients regarding error position and error value, and provides the combined data for the selector 40. The output signal of the selector 40 is sent to the Chien search circuit 25 via a direct bus P2 shown in FIG. 6.

Figure 10:
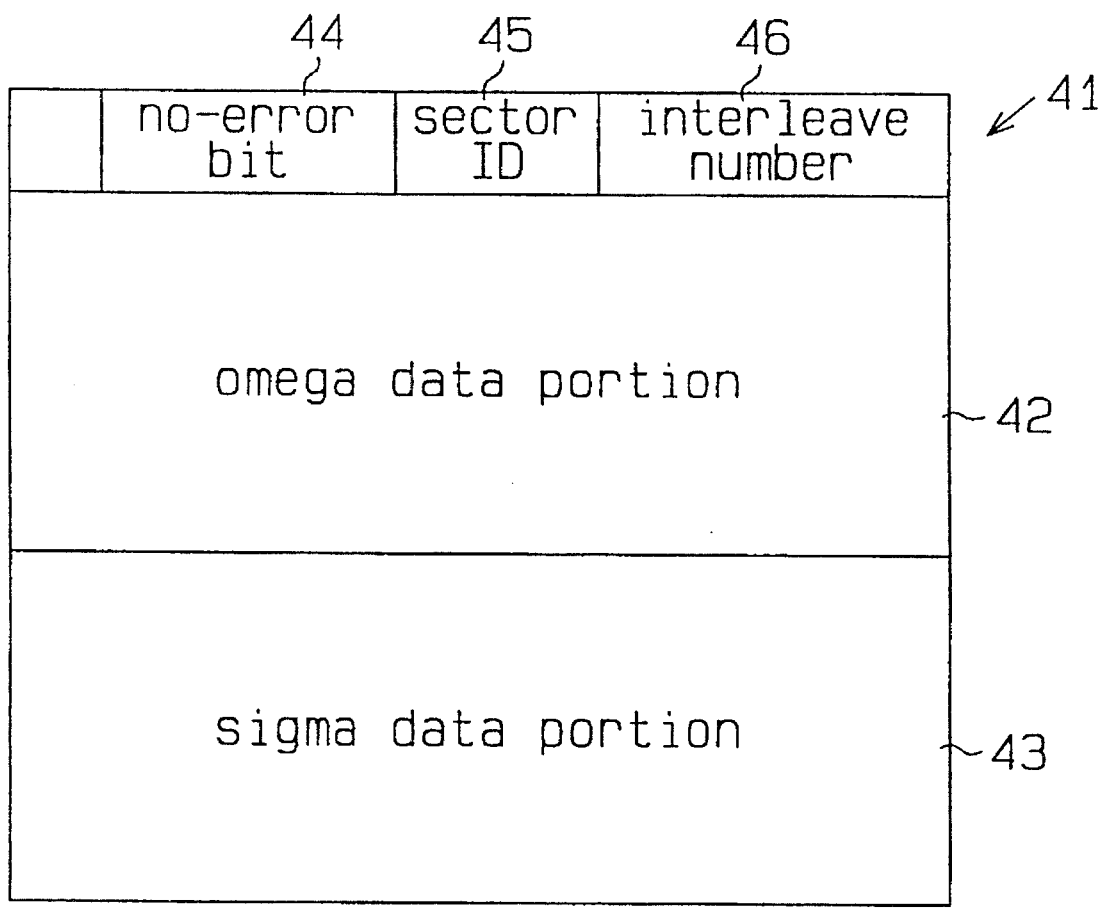
FIG. 10 is a diagram showing the data format of one sector of data that is sent to a Chien search circuit from the reducer circuit.

FIG. 10 shows the transfer format of one sector of data output from the reducer circuit 24. This one sector of data consists of an ID data field 41 for storing a packet ID, an omega data field 42 for storing the error position coefficients, and a sigma data field 43 for storing the error value coefficients.

The ID data field 41 essentially includes a no-error bit 44, a sector ID 45, and an interleave number 46. Stored in the no-error bit 44 is either "0" or "1". "1" is stored in the no error bit 44 when the values of the ECC syndrome SYN are all "0". In this case, the Euclidean algorithm circuit 39 is not activated and only the ID data field 41 is output to the Chien search circuit 25.

Stored in the sector ID 45 is ID data that specifies which sector the data belongs. Stored in the interleave number 46 is data indicating which sector's interleaving is performed.

As shown in FIG. 13, when a PENBL signal output to the reducer circuit 24 from the Chien search circuit 25 goes high following the time the reducer circuit 24 has completed the computation for data, the Chien search circuit 25 is set to receive data from the reducer circuit 24. Then, the reducer circuit 24 outputs an H-level PSTRB signal to the Chien search circuit 25 in synchronism with the next falling DN2 of the clock signal CLK. When "0" is stored in the no-error bit 44, the reducer circuit 24 sequentially transfers data PLY, stored in the ID data field 41, the omega data field 42 and the sigma data field 43, to the Chien search circuit 25, 8 bits at a time.

The Chien search circuit 25 computes the error position and error value based on the error position polynomial equation and error value polynomial equation, using the error position coefficients and the error value coefficients output from the reducer circuit 24, in the same manner as done in the conventional art. The Chien search circuit 25 compares the number of the computed error positions with the order in the error position polynomial equation to determine if the error position and error value have been computed correctly. Further, an unillustrated CRC computing circuit incorporated in the Chien search circuit 25 generates the CRC syndrome, based on the CRC codes and the error-corrected bytes, which are incorporated in the data portion in FIG. 5.

The Chien search circuit 25 outputs data of the error position and the error value as error information data to the buffer memory controller 20. The circuit 25 generates the packet ID and the CRC syndrome to be combined with the error information data, and provides the combined data for the buffer memory controller 20 via a direct bus P3 shown in FIG. 6.

Figure 11:
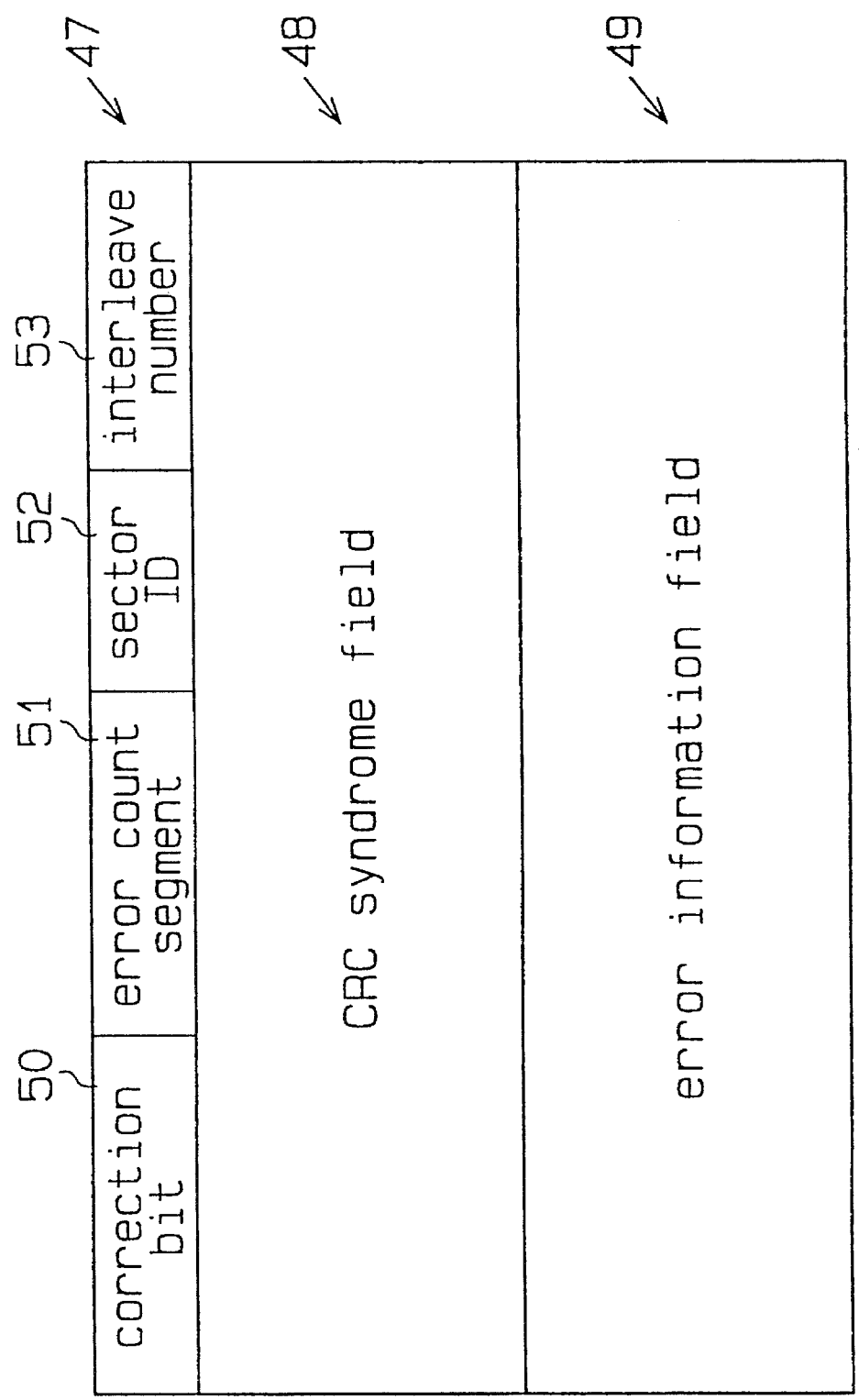
FIG. 11 is a diagram showing the data format of one sector of data that is sent to a buffer memory controller from the Chien search circuit.

FIG. 11 shows the transfer format of one sector of data output from the Chien search circuit 25. This one sector of data consists of an ID data field 47 for storing a packet ID, a CRC syndrome field 48 for storing the CRC syndrome and an error information field 49 for storing the error position and error value.

The ID data field 47 essentially consists of a 1-bit correction bit 50, a 4 bit error count segment 51, a sector ID 52 and an interleave number 53.

A value of "0" or "1" is stored in the correction bit 50. "1" is stored in the correction bit 50 when error correction can not be performed. In this case, only the ID data field 47 is output to the buffer memory controller 20.

ID data stored in the sector ID 52 specifies which sector the data belongs. Stored in the interleave number 53 is data indicating which sector's interleaving is performed.

As shown in FIG. 14, when an EENBL signal output from the buffer memory controller 20 goes high following the completion of computations by the Chien search circuit 25 respecting the error position, error value and CRC syndrome, the buffer memory controller 20 then is set to receive data from the Chien search circuit 25. Then, the Chien search circuit 25 outputs an H-level ESTRB signal to the buffer memory controller 20 in synchronism with the next falling DN3 of the clock signal CLK. When "0" is stored in the correction bit 50, the Chien search circuit 25 sequentially transfers data EDT, stored in the ID data field 47, the CRC syndrome field 48 and the error information field 49, to the buffer memory controller 20, 16 bits at a time, starting from the ID data field 47.

Based on the error position information, the buffer memory controller 20 reads data located at the associated address. The buffer memory controller 20 also corrects the data based on the error value information and writes the corrected data again in the buffer memory 16.

Further, the buffer memory controller 20 sequentially performs an exclusive OR (EOR) operation on the CRC syndromes output from the Chien search circuit 25 to compute one sector of CRC syndrome values.

In this data correcting apparatus as described above in detail, the syndrome generator 23 and the reducer circuit 24 are connected by the direct bus P1, the reducer circuit 24 and the Chien search circuit 25 are connected by the direct bus P2, and the Chien search circuit 25 and the buffer memory controller 20 are connected by the direct bus P3.

By affixing a packet ID to data transferred between the individual circuits, each circuit recognizes the particular sector interleave corresponding to the data used by the individual circuit. The recognition of data by each circuit eliminates the need for the internal processor 22 to monitor data transfer among the individual circuits and reduces the time required for data access between the individual circuits and the internal processor 22. This improves the data processing speed. The data recognition also reduces the time required by the internal processor 22, to transfer data among the individual circuits. This increases data processing speed.

With regard to the sector that contains an error, buffer memory controller 20 corrects error data in the buffer memory 16 based on the error position information and error value information computed by the Chien search circuit 25. As the data correction requires no accessing by the internal processor 22, the processing speed for the data correction can be improved.

The CRC syndromes computed by the Chien search circuit 25 are transferred together with the error position information, error value information and packet ID to the buffer memory controller 20 to undergo a sequential EOR operation. When the operation of transferring one sector of data is complete, the buffer memory controller 20 computes CRC data. This computation of CRC data eliminates the need for access by the internal processor 22, thus improving the processing speed for checking if the result of the CRC data based error correction is correct.

The Chien search circuit 25 determines whether or not the number of the computed error positions is accurate, based on the order of the error position polynomial equation. This determination eliminates the need for the internal processor 22 to make computation-based determinations of whether the number of the error positions is correct. This reduces the operational time demands of the internal processor 22. This allows for faster data processing.

Although only one embodiment of the present invention has been described herein, it should be apparent to those skilled in the art that the present invention may be embodied in many other specific forms without departing from the spirit or scope of the invention. Particularly, it should be understood that this invention could be embodied in the following form.

Instead sequential EOR operations performed by the buffer memory controller 20 on the CRC syndromes provided as output from the Chien search circuit 25 in order to compute one sector of CRC syndrome values, the Chien search circuit 25 may compute one sector of CRC syndrome values.

Therefore, the present examples and embodiment are to be considered as illustrative and not restrictive and the invention is not to be limited to the details given herein, but may be modified within the scope of the appended claims.

What is claimed is:

1. An apparatus for correcting error data contained in data read from a recording medium by using an error checking and correcting code, said apparatus comprising:

storage means for storing data read out from the recording medium;

syndrome generating means, supplied with data read from said recording medium, for generating syndrome data from said read data, for generating first ID data identifying said syndrome data, and for outputting said syndrome data and said first ID data therefrom;

detecting means, coupled to said syndrome generating means, for detecting a position and value of the error in said read data as error information data, based on said syndrome data supplied from said syndrome generating means, said detecting means generating second ID data identifying said error information data and outputting said error information data and said second ID data therefrom; and correcting means, coupled to said detecting means, for correcting the error contained in said read data, based on said position and value as the error information data supplied from said detecting means.

2. The apparatus according to claim 1, wherein a first bus is provided between said syndrome generating means and said detecting means for directly supplying said syndrome data to said detecting means, and wherein a second bus is provided between said detecting means and said correcting means for directly supplying said error information data to said correcting means.

3. The apparatus according to claim 1, wherein said recording medium has a plurality of sectors for storing data, and wherein each of said first ID data and said second ID data contains data indicating the sector of the recording medium from which the read data was read, the position of the read data in said sector, and the presence or absence of an error in the read data.

4. The apparatus according to claim 1, further comprising decoding means for reading data recorded in an encoded form on said recording medium, decoding said read data, and transferring said decoded data to said storage means and said syndrome generating means.

5. The apparatus according to claim 1, wherein said detecting means includes:

a reducer circuit for computing coefficients of an error position polynomial equation and of an error value polynomial equation based on said syndrome data, and for generating third ID data identifying said computed coefficients; and a Chien search circuit, connected to said reducer circuit via a third bus, for computing an error position and an error value for the read data, based on said polynomial equations and the coefficients computed by said reducer circuit.

6. The apparatus according to claim 5, wherein said correcting means includes a buffer memory controller for correcting error data included in read data stored in said storage means, based on the error position and error value computed by said Chien search circuit.

7. A method of data communication for use in an apparatus for correcting error data contained in data read from a recording medium, said correcting apparatus including a syndrome generator for generating syndrome data, an error detector for detecting a position and value of the error in the read data from the recording medium as error information data, and a correcting unit for correcting the error contained in the read data, based on the error information data, said method comprising the steps of:

generating first ID data identifying the syndrome data by said syndrome generator to transfer said syndrome data combined with said first ID data from said syndrome generator to said error detector; and generating second ID data identifying the error information data by said error detector to said error information data combined with said second ID data from said error detector to said correcting unit.

8. The method according to claim 7, wherein said recording medium has a plurality of sectors for storing data, and wherein each of said first ID data and said second ID data contains data indicating the sector of the recording medium from which the read data was read, the position of the read data in said sector, and the presence or absence of an error in the read data.

* * * * *